United States Patent
Kamiyama et al.

[11] Patent Number: 5,991,868
[45] Date of Patent: Nov. 23, 1999

[54] APPARATUS AND METHOD FOR PROCESSING DATA WITH A PLURALITY OF FLAG GROUPS

[75] Inventors: Hiroshi Kamiyama; Masato Suzuki, both of Osaka; Shinya Miyaji, Nara, all of Japan

[73] Assignee: Matsushita Electric Industrial Co., Ltd., Osaka, Japan

[21] Appl. No.: 08/246,179

[22] Filed: May 19, 1994

[30] Foreign Application Priority Data

May 31, 1993 [JP] Japan .................................. 5-129528

[51] Int. Cl.⁶ ...................................................... G06F 9/30
[52] U.S. Cl. .............................. 712/32; 712/43; 712/210; 708/601
[58] Field of Search ................................... 395/800, 775; 364/DIG. 1, DIG. 2, 736.5, 247.3, 749

[56] References Cited

U.S. PATENT DOCUMENTS

| | | | |
|---|---|---|---|
| 4,788,655 | 11/1988 | Nakayama et al. | 364/748 |
| 4,811,266 | 3/1989 | Woods et al. | 364/736.5 |
| 4,812,971 | 3/1989 | Batts, Jr. et al. | 364/DIG. 1 |
| 5,034,879 | 7/1991 | Woodward et al. | 364/DIG. 1 |
| 5,151,993 | 9/1992 | Yamahata | 395/775 |

FOREIGN PATENT DOCUMENTS

| | | |
|---|---|---|
| 0369407 | 11/1989 | European Pat. Off. . |
| 0395348 | 4/1990 | European Pat. Off. . |
| 0437207 | 1/1991 | European Pat. Off. . |
| 54-117646 | 12/1979 | Japan . |

OTHER PUBLICATIONS

IBM, "Multiple Queued Condition Codes", IBM Technical Disclosure Bulletin, Jul. 31, (1988), No. 2, pp. 294–296.
"16–bit microprocessor 8086 family".
"Multiple Queued Condition Codes", IBM Technical Disclosure Bulletin, Jul. 31 (1988), No. 2, Armonk, New York, USA.

*Primary Examiner*—Meng-Ai T. An
*Assistant Examiner*—Walter D. Davis, Jr.
*Attorney, Agent, or Firm*—Price Gess & Ubell

[57] ABSTRACT

In a data processing apparatus, a decoding unit decodes instructions. A calculator operates N-bit data in accordance with the decoded results. A flag storage unit stores a plurality of flag groups which are changed in correspondence to data having different widths, based on the operated results. Selectors select a predetermined flag group in accordance with the direction of a conditional branch instruction. A branch judging unit judges whether a branch is taken or not by referring to the selected flag group.

12 Claims, 7 Drawing Sheets

ADD/SUBTRACT/COMPARE operation code (8bits)   addressing mode and register designation (8bits)   memory address designation (16bits)

conditional branch instruction operation code (8bits)   branch address designation (8bits)

ADD/SUBTRACT/COMPARE operation code (8bits) | addressing mode and register designation (8bits) | memory address designation (16bits)

conditional branch instruction operation code (8bits) | branch address designation (8bits)

APPARATUS AND METHOD FOR PROCESSING DATA WITH A PLURALITY OF FLAG GROUPS

BACKGROUND OF THE INVENTION

(1) Field of the Invention

The present invention relates to an apparatus and method for processing data in accordance with pro grams, and particularly to such an apparatus and method provided with a plurality of flag groups to be changed in accordance with calculation results of a plurality of data having different widths.

(2) Description of the Related Art

Recently, data processing apparatuses such as micro computers with 16-bit or 32-bit MPU (Micro Processing Unit) have been realized along with the improvement of data processing performance and demand for higher functions. These data processing apparatuses can calculate data having a plurality of different widths, such as 16 bits and 32 bits, and some of the apparatuses are provided with two or more flag groups depending on the purpose of calculations.

FIG. 1 is a block diagram showing the construction of a first conventional data processing apparatus with two flag groups, which is disclosed in Japanese Laid-open Patent Application No. 54-117646. The apparatus is provided with an instruction decoding unit 41 for decoding instructions, a calculator 42 for calculating 16-bit data, a first flag group 43 for conditional branch judgement, a second flag group 44 for arithmetic operations, and a branch judging unit 45 for judging whether a branch is taken or not.

When an instruction decoded by the instruction decoding unit 41 is an arithmetic operation instruction, the calculator 42 performs an arithmetic operation. The flags in the first flag group and the second flag group are changed in accordance with the results of the operation.

If the next instruction decoded by the instruction decoder unit 41 is an arithmetic operation instruction again, the calculator 42 performs another arithmetic operation by referring to the second flag group 44. The first and second flag groups 43 and 44 are changed in accordance with the results of the arithmetic operation.

On the other hand, if the next instruction is a conditional branch instruction, the branch judging unit 45 judges whether a branch is taken or not from the first flag group 43 for conditional branch.

However, according to the first conventional data processing apparatus, these flag groups 43 and 44 are both designed for 16-bit data. Therefore, data with fewer bits must be extended so as to fit the data width of the calculator 42. FIGS. 2A and 2B show how 8-bit data is processed in the 16-bit calculator 42, as an example of data extension.

When two 8-bit data 88H and F8H are added (H represents hexadecimal), they are made into 16-bit data by filling zeros or ones in higher bits. In the case where a branch is performed based on 8-bit unsigned data shown in FIG. 2A, the higher 8 bits are filled with zeros. In the case the data is regarded as 8-bit signed data, the value 1 on the 8th bit is extended to the higher 8 bits shown in FIG. 2B. Thus, an additional process of extending data is inevitable, which leads to the increase in process overhead.

FIG. 3 is a block diagram showing the construction of a second conventional data processing apparatus with two flag groups, which is disclosed in Shokodo's "16-bit micro processor 8086 family", March, 1982.

The apparatus is provided with an instruction decoding unit 61 for decoding instructions, a 16-bit calculator 62 for calculating data, a flag group 63 to be changed based on the result of either an 8-bit operation or a 16-bit operation, a selector 64 for selecting each input of the flag group 63 which is changed based on either the 8-bit operation or the 16-bit operation, a flag group 65 to be changed based on the result of 4-bit operation, and a branch judging unit 66 for judging whether a branch is taken or not from the flag group 63.

FIG. 4A shows the bit configuration of a machine language instruction for ADD, SUBTRACT, and COMPARE instructions, and FIG. 4B shows the bit configuration of a machine language instruction for conditional branch instructions. In the bit configuration shown in FIG. 4A, a bit in the first byte (shown by W in operation) is assigned to indicate data width in addition to the arithmetic operation type. The second byte is assigned registers to be operated and addressing mode for memory operands, the third and fourth bytes are assigned for address in memory. In the bit configuration shown in FIG. 4B, four bits in the first byte (operation code) are assigned a branch condition.

The above-mentioned data processing apparatus operates as follows.

First, an instruction is decoded by the instruction decoding unit 61. When the instruction is an arithmetic operation instruction, the calculator 62 performs an arithmetic operation. The flags in the flag group 63 and 65 are changed, based on the results of the operation. At this time, the instruction decoding unit 61 designates data width (8 bits or 16 bits) to the calculator 62 and then the selector 64 outputs flag changing data determined by the data width to the flag group 63.

The next instruction is decoded by the instruction decoding unit 61. In the case where the instruction is a conditional branch instruction, the branch judging unit 66 judges whether the branch is taken or not from the flag group 63. In the case where an instruction which follows an arithmetic operation is an arithmetic operation for decimal data, the calculator 62 performs the operation by referring to the flag group 65.

According to the second conventional data processing apparatus, the use of the flag group 65 based on 4-bit operation, which is changed concurrently with the flag group 63 based on either 8-bit operation or 16-bit operation is limited to arithmetic operations for decimal data and cannot be applied to conditional branch.

Thus, the second conventional data processing apparatus has successfully overcome the problem of process overhead by selecting between the two flag changing data depending on the two data widths of 8-bit and 16 bit. However, data width is designated in an instruction, so that two instruction code assignments (one for 8-bit data and the other for 16-bit data) are needed for each arithmetic operation. This brings about a problem of complicating the construction of the instruction decoding unit because of enlargement of instruction code assignment.

SUMMARY OF THE INVENTION

In view of the foregoing problems, an object of the present invention is to provide a data processing apparatus capable of preventing overhead in preceding process along with conditional branch for a plurality of data operation widths, and further capable of reducing the assignment of instruction codes to each operation.

The data processing apparatus of the present invention is provided with a unit for decoding instructions, a calculator for calculating N-bit (N is an integer) data in accordance with the decoded instructions, units for storing predetermined flags in accordance with the calculated results, and a unit for receiving a branch condition decoded by the instruction decoding unit and judging whether a branch is taken or not by referring to flags stored in the flag storing units.

The flag storing units store a plurality of flag groups to be changed based on the data given from the plural bit position of the N-bit calculated result.

The data processing apparatus is further provided with a selector for selecting a predetermined one of the plurality of flag storing units under the direction of the conditional branch instruction decoded by the instruction decoding unit. The branch judging unit judges whether a branch is taken or not by the use of a flag group selected by the selector.

Another object of the present invention is to provide a data processing method capable of preventing overhead in preceding process along with conditional branch for a plurality of data operation widths, and further capable of reducing the assignment of instruction codes to each operation.

The data processing method of the present invention includes a step of decoding an instruction and determining whether the instruction is an arithmetic operation instruction or a branch instruction. When it is an arithmetic operation instruction, a calculation of N-bit (N is an integer) data is executed in accordance with the decoded instruction, and the flags in the flag group corresponding to the data operation width are changed. When it is a branch instruction, a flag group corresponding to the data width specified by the branch instruction is selected, and a branch is executed with reference to the selected flag group.

According to the above-explained construction of the data processing apparatus and method, overhead in preceding process along with conditional branch for a plurality of data operation widths can be prevented, and the assignment of instruction codes-to each operation can be reduced.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 1:
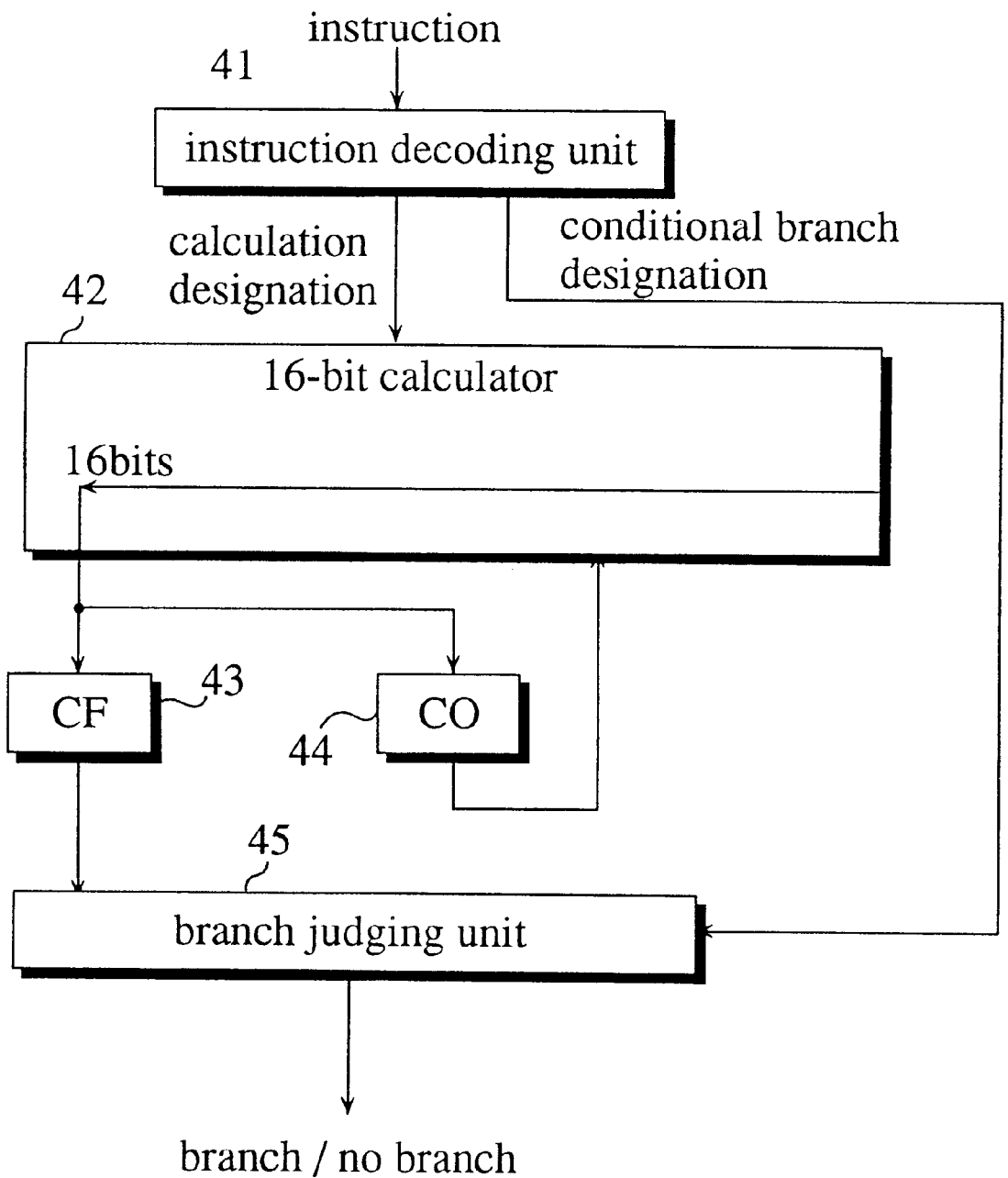
FIG. 1 is a block diagram showing the construction of a conventional data processing apparatus as a first example.
Figure 2A:
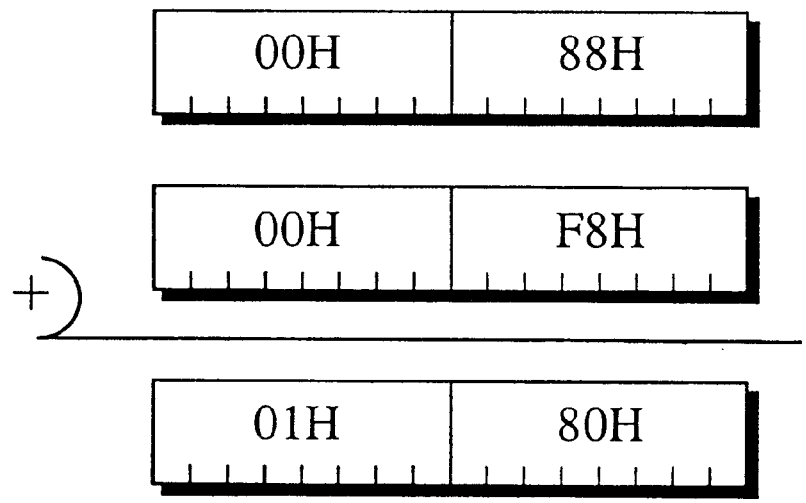
FIGS. 2A and 2B are examples of data process to be performed by the apparatus shown in FIG. 1.
Figure 2B:
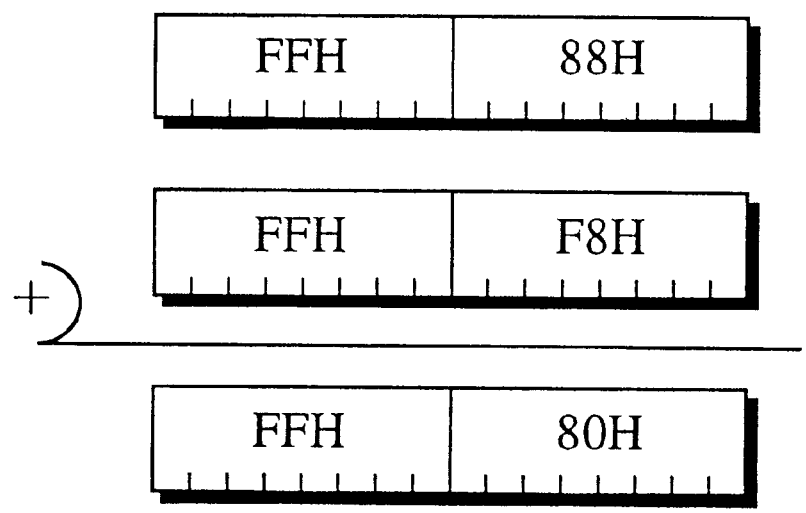
Figure 3:
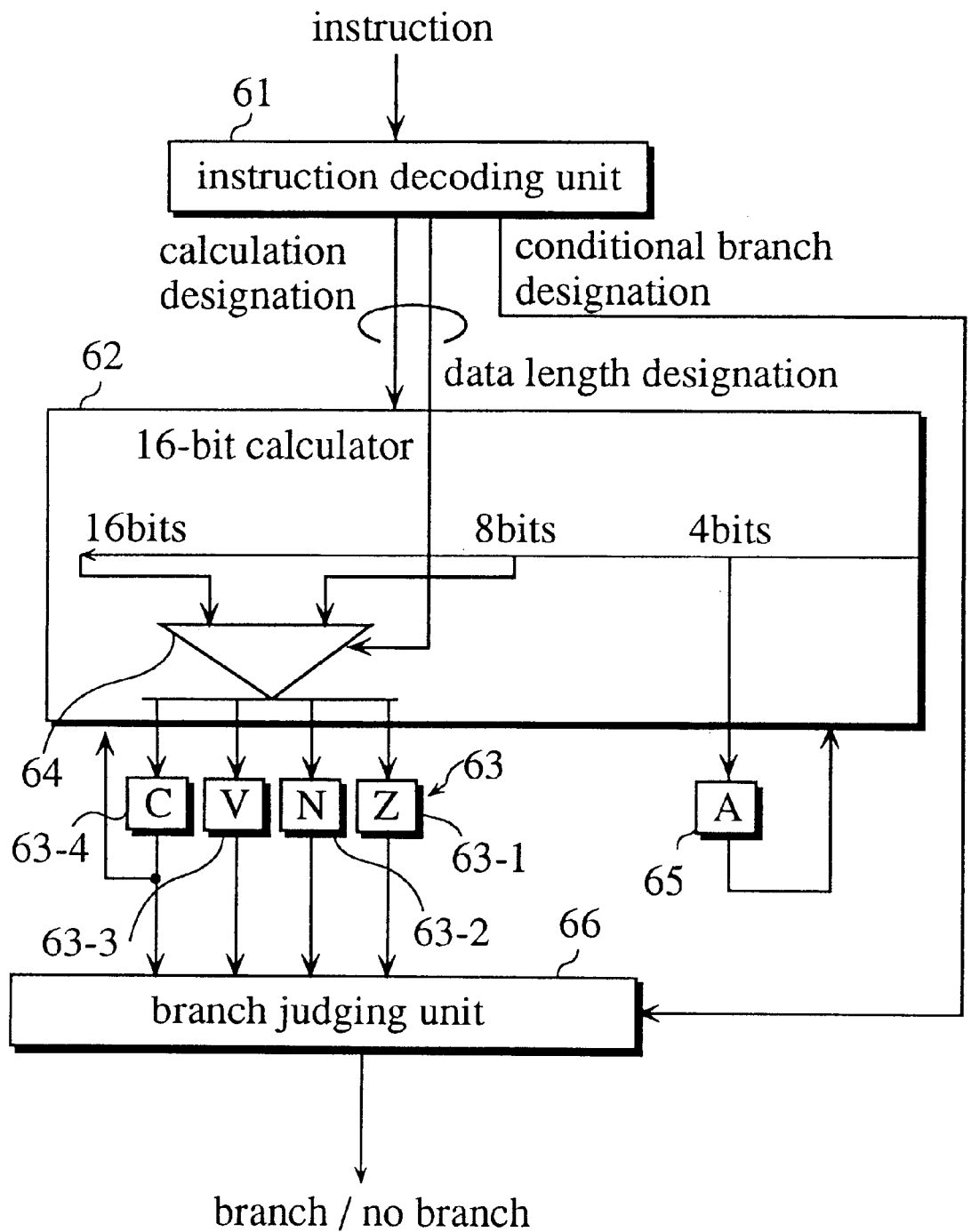
FIG. 3 is a block diagram showing the construction of another conventional data processing apparatus as a second example.
Figure 4A:
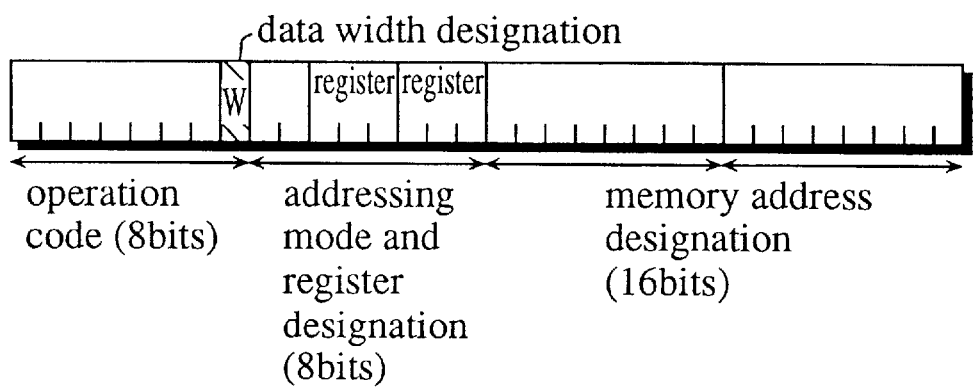
FIGS. 4A and 4B are the configurations of instruction codes to be used in the apparatus shown in FIG. 3.
Figure 4B:
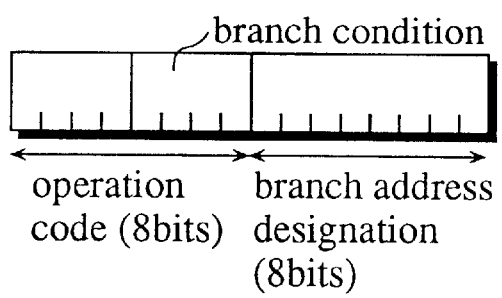
Figure 5:
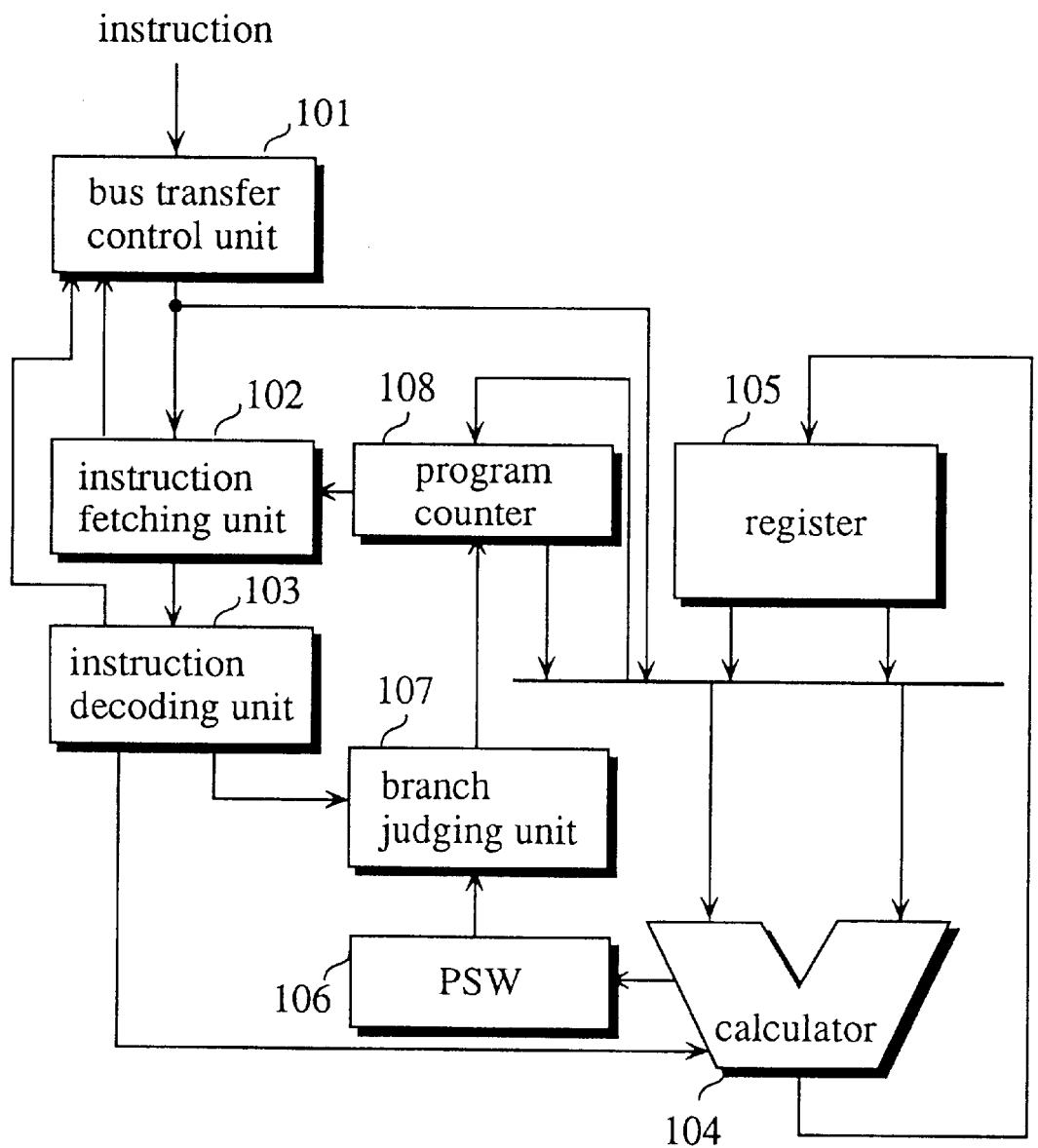
FIG. 5 is a block diagram showing the overall construction of the data processing apparatus of the present invention.
Figure 6:
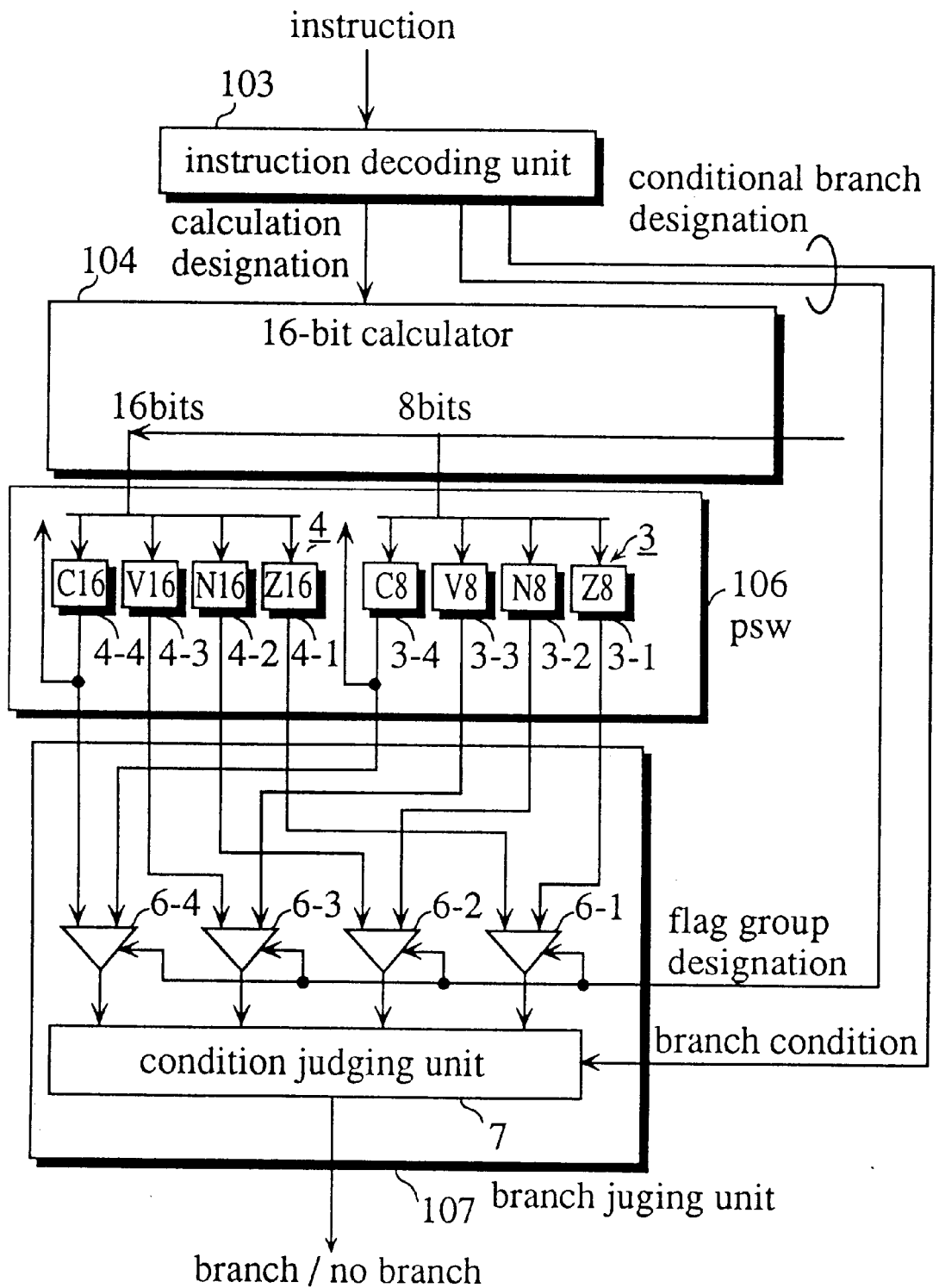
FIG. 6 is a block diagram showing the details of the main part of the apparatus shown in FIG. 5.

The overall construction of the data processing apparatus of the present invention is shown in FIG. 5, and the details of the main part of the apparatus is shown in FIG. 6.

The data processing apparatus is provided with a bus transfer control unit 101 for controlling instruction/data transfer to/from an external unit, an instruction fetching unit 102 for controlling instruction readout, an instruction decoding unit 103 for decoding instructions, a calculator 104 for operating 16-bit data, a register 105 for storing data for operation of the calculator 104, a program status word 106 (hereinafter PSW 106) for storing flag groups to be changed in accordance with the calculation results of the calculator 104, a branch judging unit 107 for judging whether a branch is taken or not, and a program counter 108 for storing an instruction address in execution.

The PSW 106 stores a first flag group 3 consisting of flags 3-1 to 3-4 corresponding to the operation of 8-bit data and a second flag group 4 consisting of flags 4-1 to 4-4 corresponding to the operation of 16-bit data. The flags are stored in eight registers of 1-bit length each in PSW 106.

The flags Z8 (3-1) and Z16 (4-1) are zero flags for indicating respectively that the result of the lower 8-bit and 16-bit calculated by the calculator 104 are all zeros. The outputs of an NOR circuit with 8 inputs and the outputs of another NOR circuit with 16 inputs are respectively connected to these flags Z8 and Z16.

The flags N8 (3-2) and N16 (4-2) are negative flags for indicating that the calculation result is negative. The 8th bit and 16th bit of the calculation result are respectively connected to these flags N8 and N16.

The flags V8 (3-3) and V16 (4-3) are overflow flags for indicating that an overflow occurs in an arithmetic operation. The output of XOR between the carries from the 7th bit and 8th bit, and between the carries from the 15th bit and 16th bit in the calculator 104 are respectively connected to these flags V8 and V16.

The flags C8 (3-4) and C16 (8-4) are carry flags indicating the occurrence of carries. The carries from the 8th bit and 16th bit in the calculator 104 are connected respectively to these flags C8 and C16.

The branch judging unit 107 is composed of selectors 6-1 through 6-4 for selecting between the first and second flag groups 3 and 4 and a condition judging unit 7 for judging whether a branch is taken or not from the selected flag group.

These selectors 6-1 through 6-4 select between the first and second flag groups 3 and 4 according to a flag group designation signal sent from the instruction decoding unit 103 and output the selected flag group to the condition judging unit 7.

The condition judging unit 7 is composed of a logical circuit responding to various judging conditions and judges whether a branch is taken or not from the condition code indicating the types of the conditional branch instructions sent from the instruction decoding unit 103 and flag data outputted from the selectors 6-1 through 6-4. If a branch is taken, the execution sequence is moved to an address predetermined by the branch instruction, and if a branch is not taken, an instruction following the branch is executed.

The following is an operational description of the data processing apparatus of the present invention.

First of all, the instruction fetch unit 102 drives the bus transfer control unit 101, thereby receiving an instruction from an external ROM or the like.

Figure 7A:
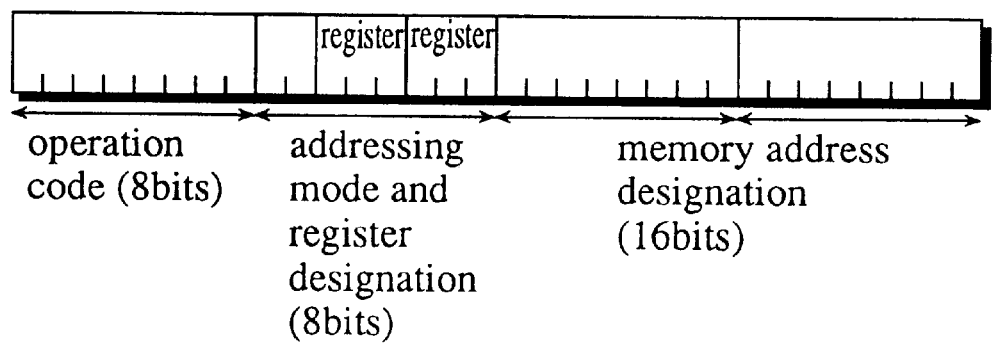
FIGS. 7A and 7B are the configurations of instruction codes to be used in the apparatus shown in FIG. 5.
Figure 7B:
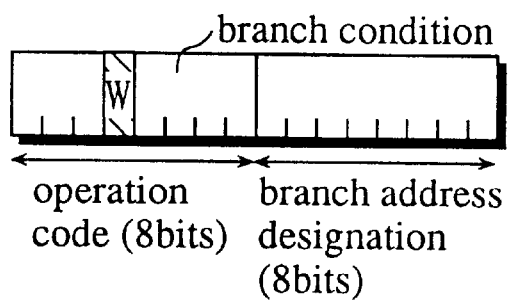

Then, the instruction decoding unit 103 decodes the instruction received. FIG. 7A shows the configuration of an arithmetic operation instruction such as ADD, SUBTRACT, or COMPARE and FIG. 7B shows the configuration of a conditional branch instruction.

In the arithmetic operation instruction, the first byte designates operation types, the second byte designates addressing modes for memory operands, or registers to be operated, and the third and fourth bytes designate memory addresses.

In the conditional branch instruction, the first byte designates instruction types, branch conditions, and the width of data operation on which the conditional judgement is based (shown by W). The second byte designates a branch target address.

The instruction decoding unit 103 decodes a received instruction, and sends control signals to the calculator 104, the register 105, and the bus transfer control unit 101, based on the decoded operation type, information on data storage location, and the like. The following are operations for processing arithmetic operation instructions and conditional branch instructions decoded.

"Arithmetic Operation Instructions"

The calculator 104 executes an operation designated by the instruction with the use of 16-bit data read from the register 105 and the operation result is stored to the register 105. The first flag group 3-1 through 3-4 are changed based on the lower 8 bits of the operation result, and the second flag group 4-1 through 4-4 are changed based on all the 16 bits of the operation result.

In order to execute 32-bit data (multiple length arithmetic operation), the calculator 104 first executes the lower 16-bit data sent from the register 105. The first flag group 3 and the second flag group 4 are changed based on the execution result. Then, the calculator 104 executes the higher 16-bit data set from the register 105 with reference to the second flag group 4. The first and second flag groups are changed based on this result.

"Conditional branch instructions"

The instruction decoding unit 103 sends the flag group designation signal to the selectors 6-1 through 6-4 of the branch judging unit 107. This signal indicates the conditional judgement width (8 bits or 16 bits) and is generated by the bit W shown in FIG. 7B. These selectors 6-1 through 6-4 select between the first and second flag groups 3 and 4 in accordance with the flag group designation signal. For example, when the designated data width is 8 bits, the selectors 6-1 through 6-4 output flag data sent from the first flag group 3 to the condition judging unit 7. On the other hand, when the designated data width is 16 bits, flag data sent from the second flag group 4 is outputted. Consequently, the condition judging unit 7 judges whether a branch is taken or not by referring to flags in the selected flag group.

Thus, the data processing apparatus of the present invention has a plurality of flag groups and selects one flag group in accordance with the width of data to be processed in a conditional branch instruction, not in an arithmetic operation instruction. Therefore, more instructions can be allocated, as compared with the conventional case where data width is designated in arithmetic operation instructions and the code length is the same. For example, while the instruction format shown in FIG. 7A allows $2^8=256$ different allocation of instruction codes to designate the arithmetic operation types, the instruction format shown in FIG. 7B where 1 bit is used to designate data width allows $2^3=8$ different allocation of instruction codes. Accordingly, 256+8=264 different allocation is possible in the present invention.

In contrast, according to the above-mentioned second conventional data processing apparatus, $2^7=128$ and $2^4=16$ different allocations are possible for arithmetic operation instructions and conditional branch instructions respectively, and accordingly not more than 144 different allocations are possible as a whole. Hence, the data processing apparatus of the present invention can increase 120 (264−144) allocation of instruction codes, compared with the conventional apparatuses.

On the other hand, when instructions having the same functions are allocated, the number of instructions can be reduced almost by half because data width designation can be omitted in the code of the arithmetic operation instructions. The reduction of the instruction numbers can simplify the construction of the instruction decoding unit 103 for decoding all the instructions therein.

In addition, even if the data operation width N of the calculator 104 is not a power of 2, data operations, whose width is greater than N and a power of 2 can be executed by using a flag group that is based on the operation result of data width, which is smaller than N and a power of 2.

For example, a 24-bit calculator can manage with 32-bit data by using a flag group based on the operation results of 16-bit data. Thus, it is possible to set data width of the calculator 104 regardless of the width of data to be processed.

In addition, the concurrent changing of two or more flag groups and the selection of one flag group that is based on the operation results of desired data width make data extensions as mentioned in the first conventional data processing apparatus unnecessary, thereby preventing overhead in preceding process for conditional branch.

Although the flag groups in this embodiment are provided for 8-bit and 16-bit data, they can be provided for data with any bits.

Although a conditional branch instruction is responsible for the data width designation in this embodiment, another instruction code may be provided, for instance before the conditional branch instruction, for designating a flag group to be used.

Although the calculator with 16 bits is used in this embodiment, a calculator with 32 bits or other bits can be used as well.

Although the present invention has been fully described by way of examples with reference to the accompanying drawings, it to be noted that various changes and modifications will be apparent to those skilled in the art. Therefore, unless such changes and modifications depart from the scope of the present invention, they should be construed as being included therein.

What is claimed is:

1. An apparatus for processing data comprising:
   an instruction decoding unit for decoding instructions, said instructions including arithmetic operation instructions and conditional branch instructions;
   a calculator for operating N-bit data in accordance with decoded instructions, N being an integer;
   a plurality of flag storage means, each of said plurality of flag storage means storing flag groups, each of said flag groups being changed based on a different bit width of N-bit data obtained by operation of said calculator;
   a flag selecting means for selecting one of said plurality of flag storage means in accordance with an indication in a conditional branch instruction decoded by said instruction decoding unit; and
   a branch judging unit for receiving a branch condition from a conditional branch instruction decoded by said instruction decoding unit and judging whether to branch, by referring to a flag group stored in a flag storage means selected by said flag selecting means.

2. The apparatus of claim 1, wherein said plurality of flag storage means have a first flag storage unit for storing flag groups, said flag groups being changed in accordance with all bits contained in N-bit data obtained by an operation of said calculator.

3. The apparatus of claim 2, wherein said calculator operates N-bit data, N being a power of 2.

4. The apparatus of claim 2, wherein said plurality of flag storage means have a second flag storage unit for storing flag groups, said flag groups being changed in accordance with a portion of the bits contained in data obtained by an operation of said calculator, said portion having a width smaller than N and equal to a power of 2.

5. The apparatus of claim 2, wherein said calculator operates N-bit data, N being not a power of 2.

6. The apparatus of claim 5, wherein said first flag storage unit stores flag groups, said flag groups being changed in accordance with all bits contained in said N-bit data which is not a power of 2.

7. The apparatus of claim 6, wherein said plurality of flag storage means have a second flag storage unit for storing flag groups, said flag groups being changed in accordance with a portion of the bits contained in data resulting from an operation of said calculator.

8. The apparatus of claim 7, wherein said instruction decoding unit has a branch instruction decoding unit for decoding a data width designation bit in a branch instruction code, and wherein said flag selecting means receives information on said data width designation bit from said instruction decoding unit and selects between flag groups read out from said first flag storage unit and flag groups read out from said second flag storage unit, outputting selected flag groups.

9. The apparatus of claim 8, wherein said calculator operates 24-bit data, said first flag storage unit stores flag groups that are changed in accordance with all bits contained in said 24-bit data obtained by an operation of said calculator, and said second flag storage unit stores flag groups that are changed in accordance with lower 16 bits of 24-bit data obtained by an operation of said calculator.

10. A method for processing data in order to perform a predetermined branch process by using a unit for decoding instructions, a calculator for executing operations, and a plurality of flag storage units each for storing flag groups to be changed based on different bit widths in an operation result, and by referring to said flag groups, said method comprising the steps of:

decoding said instructions and judging whether said instructions are arithmetic operation instructions or branch instructions;

providing arithmetic operations to N-bit data in accordance with decoded arithmetic operation instructions, N being an integer;

changing said flag groups based on a data width of a calculating operation result produced by said calculator;

selecting a selected flag group corresponding to a data width designated by [said] a decoded branch instruction; and executing a branch by referring to the selected flag group.

11. The method of claim 10, wherein the step of changing flag groups includes storing predetermined flag groups to corresponding flag storing units in accordance with arithmetic operation results of a plurality of bit widths.

12. An apparatus for processing data comprising:

an instruction decoding unit for decoding arithmetic operation instructions and conditional branch instructions;

a calculator for executing decoded instructions on data having a width of N-bits, N being an integer, to produce calculator results along with a plurality of flag groups, each flag group representing calculator results from a different bit width of data for later selecting an appropriate flag group;

storage means, for simultaneously storing the plurality of flag groups;

flag selecting means for selecting an appropriate flag group in accordance with an indication data bit width in a conditional branch instruction decoded by the instruction decoding unit; and a branch judging unit for obtaining a branch condition from a decoded conditional branch instruction and judging whether to branch, by comparing the branch condition to the appropriate flag group.

* * * * *